United States Patent
Gaeng et al.

[15] 3,687,991
[45] Aug. 29, 1972

[54] AZOMETHINE METAL COMPLEX DYES

[72] Inventors: Manfred Gaeng, Bobenheim-Roxheim; Peter Dimroth, Ludwigshafen, both of Germany

[73] Assignee: Badische Anilin- & Soda-Fabrik Aktiengesellschaft, Land Rheinland-Pfalz, Germany

[22] Filed: Feb. 16, 1971

[21] Appl. No.: 115,829

[30] Foreign Application Priority Data

Feb. 20, 1970 Germany..........P 20 07 844.8

[52] U.S. Cl. ............260/429 C, 106/288 Q, 106/292, 106/301, 260/429.9, 260/438.1, 260/439 R, 260/556 AR, 260/559 R
[51] Int. Cl. ..........C07j 3/08, C07j 3/06, C07j 15/00
[58] Field of Search .......260/566 F, 429, 429.9, 439, 260/438.1

[56] References Cited

UNITED STATES PATENTS

| | | | |
|---|---|---|---|
| 2,405,886 | 8/1946 | Hardman | 260/566 F |
| 2,993,065 | 7/1961 | Kumins et al. | 260/439 R |
| 3,440,254 | 4/1969 | Lenoir et al. | 260/429.9 |
| 3,441,578 | 4/1969 | Dimroth | 260/429.9 |

*Primary Examiner*—Tobias E. Levow
*Assistant Examiner*—A. P. Demers
*Attorney*—Johnston, Root, O'Keeffe, Keil, Thompson & Shurtleff

[57] ABSTRACT

Metal-containing azomethine pigment dyes derived from 1 mole of an o-phenylenediamine and 2 moles of a $\beta$-hydroxynaphthaldehyde which are useful for coloring printing inks, surface coatings, resins and the like.

2 Claims, No Drawings

AZOMETHINE METAL COMPLEX DYES

The invention relates to metal complex dyes having the general formula (I):

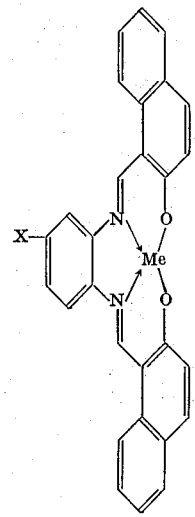

where X denotes a radical having one of the formulas CONHR or SO$_2$NHR and

Me denotes an atom of zinc, manganese, copper, cobalt, cadmium or nickel,

R denotes a hydrogen atom or a phenyl radical which may bear alkyl, alkoxy, carbamoyl, sulfonamido or halogen as substituents, a naphthyl radical or a radical having the formula: —CO—NH—C$_6$H$_5$, —CO—NH—C$_6$H$_4$CH$_3$r —CO—NH$_2$ Substituents for R, apart from those already mentioned specifically, include for example: chlorophenyl, bromophenyl, methylphenyl, ethylphenyl, dimethylphenyl, methoxyphenyl, dimethoxyphenyl, ethoxyphenyl, methylmethoxyphenyl, methylchlorophenyl, or methoxychlorophenyl.

Compounds having the formula (I) have particular industrial importance when X therein is a radical having the formula: CONH$_2$,

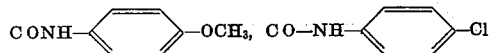

or SO$_2$NH$_2$ and Me denotes a zinc atom or preferably a nickel atom.

Compounds having the formula (I) have particular industrial importance when X therein is a radical having the formula: CONH$_2$,

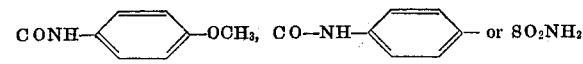

and Me denotes a zinc atom or preferably a nickel atom.

The new dyes are pigments having outstanding fastness properties. They are suitable for the production of printing inks, surface coatings and for coloring plastics. They can be brought into the form most favorable for the purpose for which they are to be used by conventional finishing operations such as reprecipitation, grinding, swelling or the incorporation of additives.

The compounds having the formula (I) may be prepared by reducing an o-nitraniline having the general formula (II):

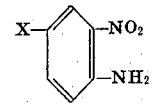

where A has the meaning given above and reacting the resultant o-phenylenediamine, with or without intermediate isolation, with β-hydroxynaphthaldehyde. The azomethines thus obtained are converted into the metal complexes for example in organic solvents such as glycol monomethyl ether, formamide, dimethylformamide, N-methylpyrrolidone, glacial acetic acid or mixtures of such solvents, with or without water, with metal donors. Examples of metal donors are the chlorides, sulfates or particularly acetates of the metals denoted by Me.

The invention is illustrated by the following Examples in which parts and percentages are by weight unless otherwise stated.

EXAMPLE 1

11 parts of 2-nitroanilinesulfonamide-(4) is hydrogenated in 100 parts of ethylene glycol monomethyl ether with Raney nickel at atmospheric pressure. After the theoretical amount of hydrogen has been absorbed, the solution is suction filtered from the catalyst (the hydrogenation product is in solution) and the catalyst is washed with about 150 parts of glacial acetic acid. The combined filtrates are added to a solution of 17.2 parts of β-hydroxynaphthaldehyde in 150 parts of glacial acetic acid and boiled for 3 hours under reflux. The whole is allowed to cool and the azomethine formed is suction filtered and washed with glacial acetic acid and methanol.

The moist filter cake is heated in 300 parts of ethylene glycol monomethyl ether with 12.5 parts of nickel acetate for 3 hours at reflux temperature. It is then allowed to cool to 50°C and is suction filtered and washed with the same solvent and hot water and dried. 24 parts of a yellowish red pigment is obtained having the formula:

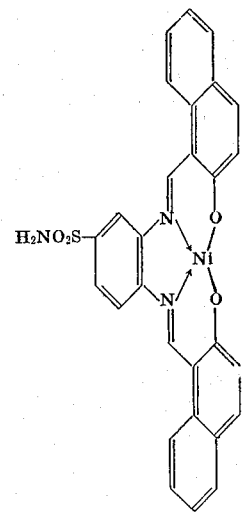

EXAMPLE 2

11 parts of 2-nitroanilinesulfonamide-(4) and 17.2 parts of β-hydroxynaphthaldehyde are heated in 200 parts of water to 70° to 80°C. 25.8 parts of sodium dithionite is introduced in the course of half an hour and then the whole is boiled under reflux for 3 hours. It is then cooled, filtered and washed with hot water.

The moist filter cake is reacted as described in Example 1 with 12.5 parts of nickel acetate, and dried. 16 parts of the pigment described in Example 1 is obtained.

EXAMPLE 3

When the 12.5 parts of nickel acetate in Example 1 is replaced by 11 parts of zinc acetate, 20 parts of the equivalent zinc complex is obtained in the form of a yellow pigment.

When the 12.5 parts of nickel acetate in Example 1 is replaced by the amounts of metal acetates specified in the Table, equivalent metal complexes are obtained in the amounts and shades specified:

| Parts | Metal acetate | Parts of pigment | Color |
|---|---|---|---|
| 10 | $Cu(CH_3COO)_2 \cdot H_2O$ | 23.5 | brown |
| 12.5 | $Mn(CH_3COO)_2 \cdot 4H_2O$ | 15 | brown |
| 13.3 | $Cd(CH_3COO)_2 \cdot 2H_2O$ | 18 | orange |
| 12.5 | $Co(CH_3COO)_2 \cdot 4H_2O$ | 22 | brownish orange |

EXAMPLE 4

13 parts of 3-nitro-4-aminobenzenesulfonylurea is hydrogenated in 100 parts of ethylene glycol monomethyl ether with Raney nickel at atmospheric pressure. After the theoretical amount of hydrogen has been absorbed, the catalyst is suction filtered and washed with 150 parts of glacial acetic acid. The combined filtrates are added to a solution of 17.2 parts of β-hydroxynaphthaldehyde in 150 parts of glacial acetic acid and boiled for 3 hours under reflux and then cooled. The precipitate is suction filtered and washed with glacial acetic acid and methanol.

The moist filter cake is boiled under reflux for 3 hours with 12.5 parts of nickel acetate in 300 parts of ethylene glycol monomethyl ether and then cooled to 50°C. The precipitate is suction filtered and washed with ethylene glycol monomethyl ether and hot water, and dried. 20 parts of a yellowish red pigment is obtained having the formula:

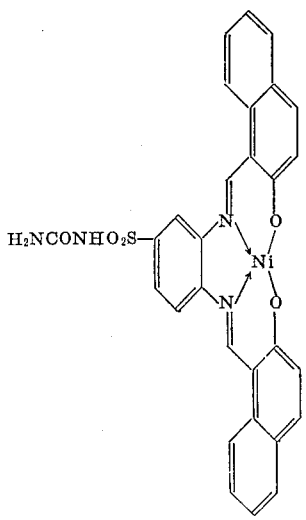

EXAMPLE 5

The 2-nitroanilinesulfonamide in Example 1 is replaced by 14.7 parts of 2-nitroanilinesulfonanilide. 26 parts of an orange pigment is obtained which bears a $SO_2NHC_6HC5$-group instead of the $SO_2NH_2$-group (see the formula in Example 1).

17 parts of a yellowish brown pigment is obtained in a corresponding manner from 16.4 parts of 2-nitroanilinesulfon-p-chloroanilide.

EXAMPLE 6

9.1 parts of 2-nitroanilinebenz-4-amide is hydrogenated at atmospheric pressure with Raney nickel in 100 parts of methanol. After the absorption of hydrogen has ended, the Raney nickel is suction filtered and washed with 100 parts by volume of glacial acetic acid. The filtrates are added to a solution of 17.2 parts of β-hydroxynaphthaldehyde in 200 parts by volume of glacial acetic acid and boiled under reflux for 3 hours. The precipitate is then suction filtered, washed with glacial acetic acid and methanol and the moist filter cake is heated under reflux for 3 hours in 400 parts of ethylene glycol monomethyl ether with 12.5 parts of nickel acetate. The whole is then allowed to cool to 50°C and the precipitate is suction filtered and washed with methanol and hot water, and dried. 23 parts of a red pigment is obtained having the formula:

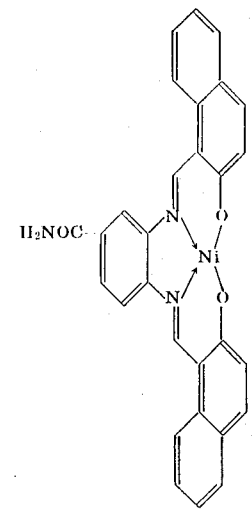

When the procedure of Example 6 is repeated but the amounts of 2-nitroanilinocarboxy-4-arylamides set out in the following Table are used instead of 9.1 parts of 2-nitroanilinocarboxy-4-amide, the corresponding pigments are obtained in the amounts and colors given. All the pigments are red. In the Table:

E = Example No.
Arylamide = 2-nitroanilinocarboxy-4-arylamide used
Paryl = parts of arylamide
Pp = parts of pigment.

| E | Arylamide | Paryl | Pp |
|---|---|---|---|

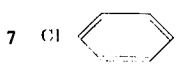

| | | | |
|---|---|---|---|
| 8 | Cl-C₆H₃(Cl)-NHOC-C₆H₃(NO₂)-NH₂ | 16.3 | 18 |
| 9 | CH₃O-C₆H₄-NHOC-C₆H₃(NO₂)-NH₂ | 14.3 | 21 |
| 10 | H₃C-C₆H₄-HNOC-C₆H₃(NO₂)-NH₂ | 13.6 | 20 |
| 11 | C₆H₅-HNOC-C₆H₃(NO₂)-NH₂ | 12.9 | 24.6 |

EXAMPLE 12

5 parts of the pigment obtained according to Example 1 or 2 is triturated with 95 parts of acrylate resin coating material consisting of 80 parts of acrylate resin solution and 20 parts of melamine resin solution in an attrition mill. A deep red coating material is obtained which after having been baked for 30 minutes at 130°C exhibits outstanding fastness to light and overspraying.

By blending 2 parts of the abovementioned acrylate resin coating material with 20 parts of white coating material (consisting of 20 parts of TiO₂ and 80 parts of acrylate resin coating material) a deep yellowish red coating material is obtained which after having been baked exhibits outstanding fastness to light and overspraying.

EXAMPLE 13

A mixture of 70 parts of polyvinyl chloride, 30 parts of dibutyl phthalate and 1 part of titanium dioxide is colored with 0.5 part of the pigment according to Example 11 by a conventional method, A red material is obtained from which, for example, film, sheeting and profiles may be prepared. The coloration is distinguished by excellent fastness to plasticizer and to light. Similar shades also having very good fastness properties are obtained when the pigments set out in the other Examples are used.

EXAMPLE 14

20 parts of the pigment according to Example 6 is triturated with letterpress or offset varnish on a three-roll mill by a conventional method. The printing ink prepared in this way gives prints having excellent color strength, fastness to light and brilliance when used in letterpress or offset printing. Printing inks having similar properties are obtained when the pigments specified in the other Examples are used.

We claim:

1. an azomethine metal complex dye having the general formula:

[structural formula showing azomethine metal complex with two naphthalene groups, X substituent, and Me metal center coordinated by N and O atoms]

where
X denotes a radical having the formula CONHR or SO₂NHR,
Me denotes an atom of zinc, manganese, copper, cobalt, cadmium or nickel, and
R denotes a hydrogen atom or a phenyl radical which may bear alkyl, alkoxy, carbamoyl, sulfamido or halogen as a substituent, a naphthyl radical or a radical having the formula: —CO—NH—C₆H₅, —CONHC₆H₄₃ or —CO—NH₂.

2. A dye as claimed in claim 1 where X in the formula denotes a radical having the formula CONH₂,

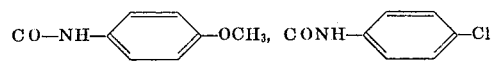

or SO₂NH₂ and Me denotes a zinc atom or a nickel atom.

* * * * *